US012314690B2

United States Patent
Ye et al.

(10) Patent No.: US 12,314,690 B2
(45) Date of Patent: May 27, 2025

(54) METHODS AND APPARATUS FOR AUTOMATIC DETECTION OF SOFTWARE BUGS

(71) Applicant: Intel Corporation, Santa Clara, CA (US)

(72) Inventors: Fangke Ye, Atlanta, GA (US); Justin Gottschlich, Santa Clara, CA (US); Shengtian Zhou, Palo Alto, CA (US); Roshni Iyer, Fremont, CA (US); Jesmin Jahan Tithi, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 926 days.

(21) Appl. No.: 17/133,238

(22) Filed: Dec. 23, 2020

(65) Prior Publication Data
US 2021/0182031 A1      Jun. 17, 2021

(51) Int. Cl.
    *G06F 8/34*       (2018.01)
    *G06F 8/60*       (2018.01)
    *G06F 8/77*       (2018.01)

(52) U.S. Cl.
    CPC .............. *G06F 8/34* (2013.01); *G06F 8/60* (2013.01); *G06F 8/77* (2013.01)

(58) Field of Classification Search
    CPC .............. G06F 8/34; G06F 8/60; G06F 8/77
    See application file for complete search history.

(56) References Cited

U.S. PATENT DOCUMENTS

| | | | |
|---|---|---|---|
| 8,336,030 B1 * | 12/2012 | Boissy | G06F 11/368 717/122 |
| 8,499,280 B2 * | 7/2013 | Davies | G06F 8/71 717/124 |
| 10,511,554 B2 | 12/2019 | Adam et al. | |
| 10,776,106 B2 * | 9/2020 | Sahu | G06F 8/75 |
| 10,809,984 B2 | 10/2020 | Mizrahi et al. | |
| 11,379,221 B2 * | 7/2022 | Zhou | G06F 11/079 |
| 11,720,600 B1 * | 8/2023 | Dixit | G06F 16/9027 707/738 |

(Continued)

FOREIGN PATENT DOCUMENTS

EP    3862822 A1    8/2021

OTHER PUBLICATIONS

Ahmet Okutan, "Use of Source Code Similarity Metrics in Software Defect Prediction", published by Cornell University, 2018, pp. 1-14 (Year: 2018).*

(Continued)

*Primary Examiner* — S. Sough
*Assistant Examiner* — Zheng Wei
(74) *Attorney, Agent, or Firm* — HANLEY, FLIGHT & ZIMMERMAN, LLC

(57) ABSTRACT

Methods, systems, and apparatus for automatic detection of software bugs are disclosed. An example apparatus includes a comparator to compare reference code to input code to detect a source code error in the input code; a graph generator to generate a graphical representation of the reference code or the input code, the graphical representation to identify non-overlapping code regions; and a root cause determiner to determine a root cause of the source code error in the input code, the root cause based on the non-overlapping code regions.

21 Claims, 9 Drawing Sheets

(56) References Cited

U.S. PATENT DOCUMENTS

| | | | | |
|---|---|---|---|---|
| 2007/0168946 | A1* | 7/2007 | Drissi | G06F 8/36 717/110 |
| 2016/0062765 | A1* | 3/2016 | Ji | G06F 8/75 717/122 |
| 2017/0177712 | A1* | 6/2017 | Kopru | G06F 16/3337 |
| 2017/0371860 | A1 | 12/2017 | McAteer et al. | |
| 2018/0309636 | A1 | 10/2018 | Strom et al. | |
| 2018/0373701 | A1 | 12/2018 | McAteer et al. | |
| 2019/0243622 | A1 | 8/2019 | Allamanis et al. | |
| 2019/0317743 | A1 | 10/2019 | Cremeans et al. | |
| 2019/0324731 | A1 | 10/2019 | Zhou et al. | |
| 2020/0074322 | A1 | 3/2020 | Chungapalli et al. | |
| 2020/0159934 | A1 | 5/2020 | Yamaguchi et al. | |
| 2020/0401662 | A1* | 12/2020 | Chen | G06F 40/30 |
| 2021/0073632 | A1 | 3/2021 | Iyer et al. | |
| 2021/0117807 | A1 | 4/2021 | Zhou et al. | |
| 2021/0210183 | A1* | 7/2021 | Niggemann | G16H 10/60 |
| 2021/0255853 | A1* | 8/2021 | Zhou | G06F 11/079 |
| 2021/0319357 | A1 | 10/2021 | He et al. | |
| 2021/0342490 | A1* | 11/2021 | Briancon | G06F 21/14 |
| 2022/0107799 | A1 | 4/2022 | Wu et al. | |
| 2022/0148699 | A1 | 5/2022 | Kogan et al. | |
| 2023/0085500 | A1* | 3/2023 | Hong | G06F 16/243 707/722 |

OTHER PUBLICATIONS

Gottschlich et al., "The Three Pillars of Machine Programming," 2018, Intel Labs, MIT, Retrieved from the Internet <https://arxiv.org/abs/1803.07244> 11 pages.

Iyer et al., "Software Language Comprehension using a Program-Derived Semantic Graph," Dec. 11, 2020, 34th Conference on Neural Information Processing Systems (NeurIPS), Computer-Assisted Programming Workshop, Vancouver, Canada, 13 pages.

Dinella, et al., "Hoppity: Learning Graph Transformations to Detect and Fix Bugs in Programs," last modified on May 22, 2020, Published as a conference paper at International Conference on Learning Representations (ICLR), 17 pages.

"CodeQLdocumentation: QL Tutorials," Dec. 18, 2020, GitHub, Inc., Retrieved from the Internet <https://help.semmle.com/QL/learn-ql/beginner/ql-tutorials.html> 2 pages.

Alam et al., "A Zero-Positive Learning Approach for Diagnosing Software Performance Regressions," last revised on Jan. 1, 2020, 33rd Conference on Neural Information Processing Systems (NurIPS), Vancouver, Canada, Retrieved from the Internet<https://arxiv.org/abs/1709.07536> 13 pages.

Amazon Code Guru, "Find Your Most Expensive Lines of Code and Improve Code Quality," Dec. 9, 2020, Amazon Web Services, Inc., Retrieved from the Internet: <https://aws.amazon.com/codeguru/> 14 pages.

Marginean et al., "SapFix: Automated End-to-End Repair at Scale," May 25-31, 2019, IEEE/ACM 41st International Conference on Software Engineering: Software Engineering in Practice (ICSE-SEIP), Montreal, QC, Canada, 10 pages.

Allamanis et al., "A Survey of Machine Learning for Big Code and Naturalness," Jul. 2018, ACM Computing Surveys, vol. 51, No. 4, Article 81, 37 pages.

Pradel et al., "DeepBugs: A Learning Approach to Name-Based Detection," Nov. 2018, Proc. ACM Program, Lang, vol. 2, OOPSLA, Article 147, 25 pages.

Ye et al., "MISIM: A Novel Code Similarity System," last revised on Oct. 9, 2020, Retrieved from the Internet: <https://arxiv.org/pdf/2006.05265.pdf> 20 pages.

Alexander Breckel, "Error mining," XP058057451, Publication date: Jun. 2, 2012, Conference Proceedings Article, Mining Software Repositories, IEEE Press, 4 pages.

Netherlands Intellectual Property Office, "Search Report National," issued in connection with Netherlands Patent Application No. 2029881, dated Feb. 16, 2023, 8 Pages.

Gottschlich et al., "The Pillars of Machine Programming," Jun. 2018, Intel Labs, MIT, 11 pages.

United States Patent and Trademark Office, "Non-Final Office Action," issued Feb. 8, 2024 in connection with U.S. Appl. No. 17/133,168, 9 pages.

United States Patent and Trademark Office, "Final Office Action," issued Jun. 21, 2024 in connection with U.S. Appl. No. 17/133,168, 11 pages.

Allamanis et al., "Learning to Represent Programs with Graphs," International Conference on Learning Representations, May 2018, 17 pages.

Netherlands Patent Office, "Search Report," issued on Feb. 27, 2023 in connection with NL Patent Application No. 2029883, 26 pages, including machine translation.

Alon et al., "code2vec: Learning Distributed Representations of Code," Proceedings of the ACM Program on Programming Languages, Jan. 2019, Article 40, retrieved from <https://dl.acm.org/doi/pdf/10.1145/3290353>, 29 pages.

Luan et al., "Aroma: Code Recommendation via Structural Code Search," Oct. 2019, Article 152, retrieved from <https://dl.acm.org/doi/pdf/10.1145/3360578>, 28 pages.

Ben-Nun et al., "Neural Code Comprehension: A Learnable Representation of Code Semantics," ArXiv, Nov. 29, 2018, retrieved from <https://arxiv.org/pdf/1806.07336.pdf>, 17 pages.

Wikipedia, "Multi-label Classification," Dec. 8, 2020, retrieved from <https://en.wikipedia.org/w/index.php?title=Multi-label_classification&oldid=993057796>, 4 pages.

Github, "Tree-Sitter," Nov. 26, 2020, retrieved from <https://github.com/tree-sitter/tree-sitter/tree/53949b09fdca24bb9d3c17df0404fa96c6ced2f1>, 2 pages.

Parr, "ANTLR," 2014, retrieved from <https://www.antlr.org/>, 3 pages.

Bahdanau et al., "Neural Machine Translation By Jointly Learning to Align and Translate," ArXiv, May 19, 2016, retrieved from <https://arxiv.org/pdf/1409.0473.pdf>, 15 pages.

Schlichtkrull et al., "Modeling Relational Data with Graph Convolutional Networks," ArXiv, Oct. 26, 2017, retrieved from <https://arxiv.org/pdf/1703.06103.pdf>, 9 pages.

Cosentino et al., "A Systematic Mapping Study of Software Development with GitHub," IEEE Access, vol. 5, pp. 7173-7192, Jun. 7, 2017, 20 pages.

Ellis et al., "Write, Execute, Assess: Program Synthesis with A REPL," 33rd Conference on Neural Information Processing Systems, 2019, 10 pages.

Kipf et al., "Semi-Supervised Classification with Graph Convolutional Networks," ICLR, Feb. 22, 2017, 14 pages.

Radoi, "Unhack all the Code!," Dec. 4, 2019, 9 pages.

Ragan-Kelley et al., "Halide: A Language and Compiler for Optimizing Parallelism Locality, and Recomputation in Image Processing Pipelines," PLDI, Jun. 2013, 12 pages.

Satish et al. "Can Traditional Programming Bridge the Ninja Performance Gap for Parallel Computing Applications," Communication of the ACM, vol. 58, No. 5, May 2015, 10 pages.

* cited by examiner

METHODS AND APPARATUS FOR AUTOMATIC DETECTION OF SOFTWARE BUGS

BACKGROUND

A flaw, failure, error or fault in a computer software or system causing unexpected or incorrect results is identified as a software bug. Software bugs can cause stability issues and operability problems, such that a program stops executing or executes improperly. Such bugs can be introduced, for example, because of unintentional program developer-based errors during a programming process (e.g., incorrect and/or inaccurate coding). While some software bugs are identified during a testing phase of software development, others can go undetected until the software has been deployed.

BRIEF DESCRIPTION OF THE DRAWINGS

The figures are not to scale. In general, the same reference numbers will be used throughout the drawing(s) and accompanying written description to refer to the same or like parts, elements, etc.

Figure 1:
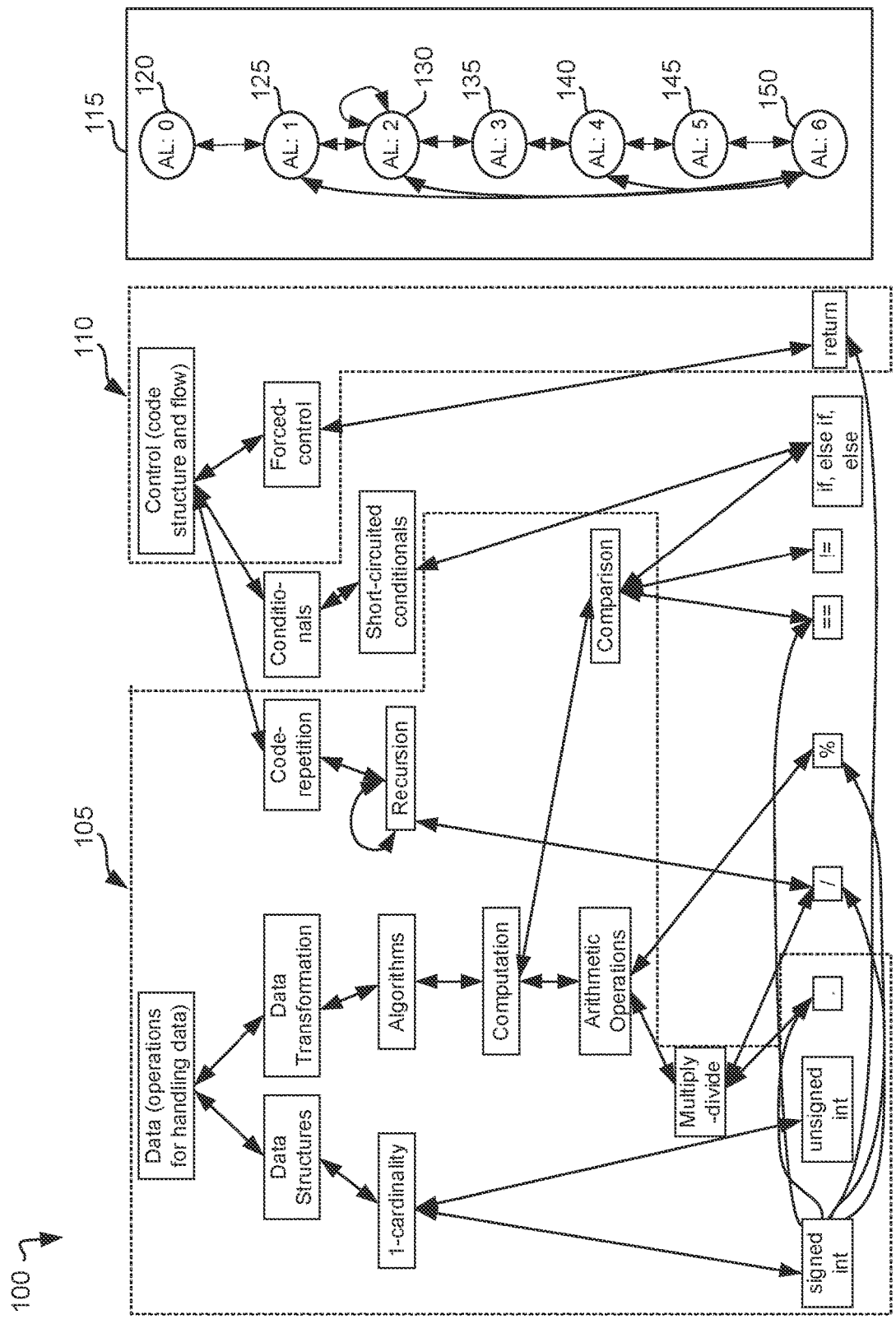
FIG. 1 illustrates an example program-derived semantic graph (PSG) that can be used as part of the automatic software bug detection techniques disclosed herein.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods, systems, and apparatus for automatic detection of software bugs are disclosed herein. Software-based errors, flaws, and/or faults can result in incorrect and/or unexpected results during program execution. For example, mistakes and/or errors in the program's design and/or source code can cause the program to crash or freeze a computer. In some examples, security-related bugs allow a user with malicious intents to bypass access controls to obtain unauthorized access privileges. Bugs include typographical errors (e.g., incorrect logical and/or mathematical operators). Robust testing and/or program analysis is required to identify and fix bugs that affect software program functions and features and/or prevent the program from properly executing. In some examples, defensive programming solutions aid in the identification of typographical errors while unit testing methodologies allow identifying flaws based on testing of functions that a piece of software might need to perform during operation. As such, identification, resolution, and correction of software bugs can be used to increase the stability of operation and accurate output.

Machine programming (MP) focuses on automating the development and maintenance of software. In addition to using machine learning techniques, machine programming allows the use of formal program synthesis techniques that provide mathematical guarantees to ensure precise software behavior. Automatic bug detection, as a part of MP, can help to increase software development productivity by saving developers' time for debugging and improve software reliability by finding unknown bugs in existing code. Traditional rule-based approaches can find a pre-defined set of bugs by applying static or dynamic analyses to target programs and checking if the programs' behavior violate certain rules. In recent years, machine learning-based bug detection has emerged as a popular alternative to the traditional bug detection approaches due to advances in machine learning and the availability of large-scale source code corpora. Such learning-based techniques try to learn code patterns and probabilistic rules from the corpora and use them to infer potential bugs in the target code, and thus can discover potential bugs that are difficult for traditional rule-based approaches to identify. However, such learning-based approaches often do not provide an explanation of the root causes of the identified bugs. This is partly due to the lack of explainability, in terms of code semantics, in the underlying program representations used as input to the models.

For example, existing approaches for bug detection include code analysis platforms used to detect security vulnerabilities in code (e.g., CodeQL). Such detection can include a detection mechanism that relies on running handcrafted queries that define the vulnerabilities on the target code with static analyses. Other approaches include learning-based bug detection that can automatically find bugs related to abnormal identifier names in the code (e.g., DeepBugs), end-to-end bug detection and fixing tools that use a neural network to learn small code change commits (e.g., Hoppity for JavaScript), and/or machine learning models to detect anomalies in runtime data collected from hardware performance counters to automatically detect performance bugs introduced by changes in code (e.g., AutoPerf). Additional known approaches include machine learning-based tools that can identify performance anomalies in the execution of an application and bugs related to concurrency, resource management, and input validation (e.g., Amazon CodeGuru) and/or systems to automatically identify, locate and fix crashing bugs (e.g., SapFix) by assessing crash reports produced by a testing system, applying static and dynamic analyses to locate the bugs and apply necessary corrections to the code (e.g., reverting, applying patch templates, code mutation, etc.). However, traditional rule-based solutions are limited by requirements of human-written rules. Such rules require considerable human effort to compose and can introduce difficulties in expressing some semantic bugs (e.g., a bug that does not trigger any runtime error but results in an incorrect result). While prior machine learning bug detectors have the potential to identify such bugs and can fix them by learning patterns from existing code, they do not provide a root cause for the bugs that are identified, potentially due to their use of black-box models and syntactic representations (e.g., abstract syntax trees).

Examples disclosed herein may be used to automatically detect software bugs with associated root cause analysis. For example, while automatic bug detection is a key step for automating the software development process, bug detection is not coupled with root cause analysis. The bug root cause detection system presented herein not only mitigates the process of locating a bug but also provides insights to potentially point out the causes of such a bug, thereby shortening the software development cycle for developers. Specifically, examples disclosed herein permit automatic bug detection and root cause analysis based on program-derived semantic graph(s) (PSGs), which serves as a hierarchical graph representation of code that can capture the semantics of code at various abstraction levels, thereby providing a semantically meaningful root cause for bugs detected using this approach. In examples disclosed herein, a code similarity system (e.g., machine inferred code similarity (MISIM), Aroma, code2vec, etc.) can be combined with the program-derived semantic graph (PSG) for bug root cause detection, improving the accuracy of the bug code detection system. For example, while the code similarity system (e.g., MISIM) can effectively identify semantically similar code and screen out code that is irrelevant, the PSG can reveal the location (e.g., line index) of a bug. As such, examples disclosed herein provide a novel pipeline that uses state-of-the art code similarity systems in combination with PSGs to detect bug root causes. Additionally, examples disclosed herein provide a sub-pipeline that utilizes a similarity system to identify reference copies of code (e.g., "golden" copies of code, vetted semi-trust code) and clusters an identified reference copy with similar code for bug identification and root cause assessment.

FIG. 1 illustrates an example program-derived semantic graph (PSG) 100 that can be used as part of the automatic software bug detection system and methods described herein. In the example of FIG. 1, the PSG 100 illustrates a PSG of an example recursive power function, with example node overlap regions 105, 110 indicating areas of overlap in the nodes of a PSG for an interactive power function (e.g., an overlap of 17 of 24 total nodes, or ~70% overlap). The PSG is a graphical structure that captures semantics from code at many levels of granularity and allows for automatic extraction of the program semantics. Unlike abstract syntax trees, contextual flow graphs, and/or simplified parse trees, PSGs introduce a hierarchical structure that varies the semantic coarseness and fineness from top to bottom. For example, as a graph, the PSG can effectively encode structural information and/or provide an effective representation for graph neural networks (GNNs) used to learn latent features or semantic information. Furthermore, the PSG includes both semantic and syntactic information through hierarchical abstraction levels. For example, higher levels of abstraction capture more abstract and more general semantic information while lower levels of abstraction encode more syntactic and precise information. PSGs can include various abstraction levels, including an abstraction level that can be programming-language specific. For example, FIG. 1 includes an example PSG abstraction level (AL) diagram 115, including abstraction levels 120, 125, 130, 135, 140, 145, 150. For example, abstraction level 0 (AL: 0) represents a highest level of semantic abstraction (e.g., data, operations for handling data, control, code structure and flow, etc.), abstraction level 3 (AL: 3) represents an intermediate abstraction level (e.g., computation), and abstraction level 6 (AL: 6) represents the lowest level of syntactic abstraction (e.g., signed int, unsigned int, if, else if, etc.). In the example of FIG. 1, PSG 100 captures semantics from two code snippets that are semantically equivalent but syntactically different (e.g., a code snippet that performs an operation recursively and a code snippet that performs an operation iteratively). Methods and apparatus disclosed herein use program-derived semantic graphs (PSGs) to identify potential root causes of software bugs, as described in connection with FIGS. 3-5.

Figure 2:
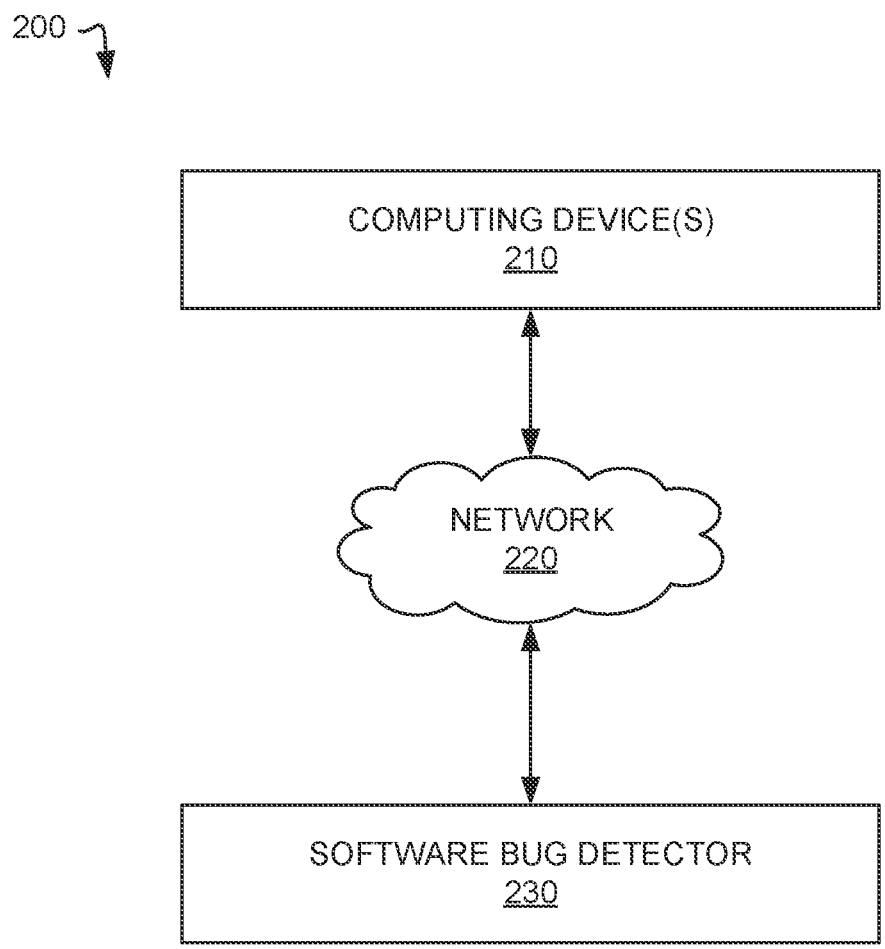
FIG. 2 illustrates an example system constructed in accordance with teachings of this disclosure and including an example software bug detector for automatic detection of software bugs and assessment of their root cause(s).

FIG. 2 illustrates an example system 200 constructed in accordance with teachings of this disclosure and including an example software bug detector 230 for automatic detection of software bugs and assessment of their root cause(s). The example environment 200 includes example computing device(s) 210, an example network 220, and the example software bug detector 230.

In the example of FIG. 2, computing device(s) 210 can implement a workstation, a personal computer, a tablet computer, a smartphone, a laptop, and/or any other type of computing device that uses computer and/or mobile software (e.g., applications). The computing device(s) 210 may host applications used in receiving and sending electronic communications. For example, the computing device(s) 210 may host applications such as a messaging application, a phone call application, social media applications (e.g., Twitter, Facebook, Instagram, etc.), an email application, a browser application, and/or instant messaging applications (e.g., Skype). However, other applications may additionally and/or alternatively be included on the computing device(s) 210. The example computing device(s) 210 can communicate with other devices on the network 220 via a wireless and/or wired connection. The example computing device(s) 210 can include a communication interface that allows for the submission of potential source code samples (e.g., samples to be assessed to determine the presence of software bugs) to the software bug detector 230 via the network 220. In some examples, the potential source code samples (e.g., a code snippet, a few lines of consecutive code, a function, a source file, etc.) are provided to the software bug detector 230 from one or more code repositories (e.g., open-source projects on GitHub, proprietary source code repositories, etc.).

In some examples, the communication interface used to transmit a potential source code sample from the computing device(s) 210 to the software bug detector 230 is wired (e.g., an Ethernet connection). In other examples, the communication interface is wireless (e.g., a WLAN, a cellular network, etc.). However, any other method and/or system of communication may additionally or alternatively be used such as, for example, a Bluetooth connection, a Wi-Fi connection, etc. In some examples, the wireless communication between the computing device(s) 210 and the software bug detector 230 can be implemented using a cellular connection via a Global System for Mobile Communications (GSM) connection. However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the example of FIG. 2, the network 220 may be implemented using any type of public or private network including the Internet, a telephone network, a local area network (LAN), a cable network, and/or a wireless network. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the example of FIG. 2, the software bug detector 230 is used to identify software bugs and potential root causes associated with the identified bugs, as described in connection with FIGS. 3-5. In some examples, software-based source code snippets can be received by the software bug detector 230 from the computing device(s) 210. The example software bug detector 230 can be compatible with source code samples associated with any type of code, including a compiled programming language (e.g., C, C++, Swift, etc.), an interpreted programming language (e.g., JavaScript, Python, etc.) and/or executable object code (e.g., compiled binary code, portable executable files, complied executable object code, etc.). Additionally, the source code completeness can be evaluated and/or categorized as (1) complete (e.g., compilable, interpretable, and/or executable), and/or (2) incomplete (e.g., non-compilable, non-interpretable, non-executable). For example, incomplete code can include a code fragment with undefined variable references. The software bug detector 230 can be implemented in and/or by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field-programmable gate array (FPGA), tensor processing unit (TPU), and/or field programmable logic device(s) (FPLD(s)).

Figure 3:
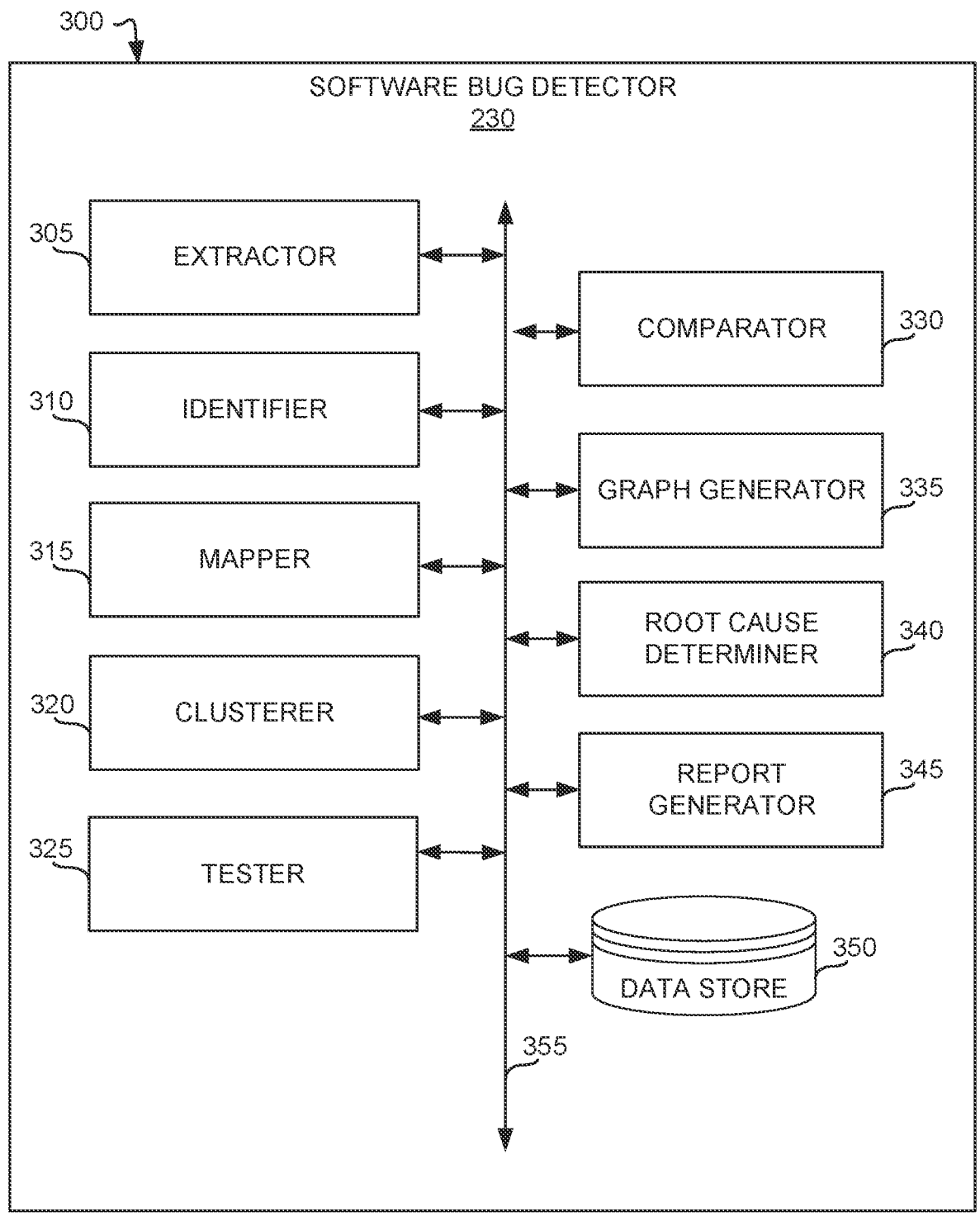
FIG. 3 is a block diagram of the example software bug detector of FIG. 2 constructed in accordance with teachings of this disclosure.

FIG. 3 is a block diagram 300 of the example software bug detector 230 of FIG. 2 constructed in accordance with teachings of this disclosure. The software bug detector 230 includes an example extractor 305, an example identifier 310, an example mapper 315, an example clusterer 320, an example tester 325, an example comparator 330, an example program-derived semantic graph (PSG) generator 335, an example root cause determiner 340, an example report generator 345, and/or an example data store 350. In the example of FIG. 3, any of the extractor 305, the identifier 310, the mapper 315, the clusterer 320, the tester 325, the comparator 330, the program-derived semantic graph (PSG) generator 335, the root cause determiner 340, the report generator 345, and/or the example data store 350 may communicate via an example communication bus 355. In examples disclosed herein, the communication bus 355 may be implemented using any suitable wired and/or wireless communication.

The example extractor 305 extracts code snippets from one or more code repositories (e.g., open-source projects on GitHub, proprietary code repositories in a company, etc.). For example, the extractor 305 identifies code in which a user of the system would like to identify software bugs. In some examples, the extractor 305 extracts code for which exhaustive cases exist for a portion of the code or the entire code. In some examples, the extractor 305 obtains a few lines of consecutive code, a function, and/or a source file (e.g., depending on the nature of a user's software bug analysis request). As such, the example extractor 305 can construct a codebase consisting of source code snippets.

The example identifier 310 identifies correct (reference) copies of code, which refer to subset(s) of code snippets that are determined to be correct (e.g., bug-free) based on set criteria. For example, the identifier 310 determines whether a comprehensive test suite is available for at least a portion of the code snippets extracted using the extractor 305 from a code repository. For example, if the identifier 310 determines that a test suite is available, any code that passes the test suite can be marked as a reference copy (e.g., free of bugs). In some examples, if a test suite is not available for a given code snippet, the identifier 310 uses a code similarity system (e.g., machine inferred code similarity (MISIM), Aroma, code2vec, etc.) and/or other semi-trusted labels (e.g., GitHub stars) to identify the reference copies of code. For example, the identifier 310 can use the code similarity system to translate code snippets to their vector forms for use by a clustering algorithm (e.g., k-means clustering, mean-shift clustering, density-based spatial clustering and application with noise (DBSCAN), locality sensitive hashing, etc.) to produce clusters of codes, such that each cluster contains semantically-similar codes. In some examples, the identifier 310 determines the reference copy of code from within each of the clusters. For example, the identifier 310 can define a centroid of the cluster as the reference copy of the code. In some examples, the identifier 310 can use semi-trusted labels (e.g., number of GitHub starts) as the criteria for selecting one or more reference copies of the code.

The example mapper 315 performs mapping of source code during identification of a reference code copy for code snippets where exhaustive tests are not available or only a partial test exists. For example, the mapper 315 can map a source code using a graph-based neural network (e.g., deep neural networks (DNNs), etc.) to obtain the code snippet in the form of a vector. For example, graph neural networks (GNNs) can generalize deep neural network models to graph structured data, allowing for evaluation of graph-structured data either from a node level or a graph level.

The example clusterer 320 uses clustering algorithms (e.g., k-means clustering, mean-shift clustering, DBSCAN, etc.) to produce clusters of codes. For example, clustering algorithms can be used to produce clusters of codes by relying on a code similarity system that translates the code snippets to their vector forms. As such, in some examples, the reference code copy is identified using clustering when comprehensive test suites are not available. In some examples, the clusterer 320 clusters the code based on a threshold (e.g., a level of semantic similarity between the codes). In examples disclosed herein, semantic similarity refers to the level of similarity between a first code and a second code (e.g., similarity of features extracted from the first code and the second code, mapping code into a vector space of natural language for comparison, etc.). In some examples, the clusterer 320 uses k-means clustering, putting observations (e.g., code snippets) into k clusters in which each observation belongs to a cluster with the nearest mean. In some examples, the clusterer 320 inputs the number of clusters k into the clustering algorithm. In some examples, the clusterer 320 uses k-means clustering to determine an inertia (e.g., within-cluster sum of squares of distances to the cluster center). For example, the k-means clustering algorithm can be used to choose centroids that minimize the inertia, which can be recognized as a measure of how internally coherent clusters are. In some examples, the clusterer 320 uses mean-shift clustering, which is based on assigning data points to clusters iteratively by shifting points towards the mode, where the mode represents the highest density of data points in the region. For example, unlike k-means clustering, mean-shift clustering does not require specifying a number of clusters in advance. Instead, the number of clusters can be determined by the algorithm with respect to the data, but such an approach can be more computationally expensive. As such, the clusterer 320 can determine the type of clustering algorithm to use based on, for example, computational resources and/or data availability. In some examples, the clusterer 320 can use unsupervised machine-based learning to find reference copies of code without the presence of comprehensive test cases. For example, unsupervised learning allows for a target reference copy of the code to not be known, yet permits the use of patterns and/or trends in data to provide the identification (e.g., using the identifier 310) of the reference code copy.

The example tester 325 tests code based on existing test suite(s) to determine a reference code copy. For example, identification of a reference copy (e.g., using the identifier 310) can rely on the assumption that there are comprehensive test suites available for at least a portion of code from the code repository, such that any code that passes the test suites can be marked as reference copies of code. If such test suites are available, the example tester 325 determines whether a specified code passes the test suite via comprehensive testing (e.g., comparing the provided code to code in existing test suites), thereby being marked as a reference copy.

The example comparator 330 uses the reference copy identified by the identifier 310 as a standard to compare with semantically similar code for bug and bug root cause detection. In some examples, the example comparator 330 compares program-derived semantic graphs (PSGs) generated for (1) a reference copy and (2) a provided code snippet from a code base (e.g., using the graph generator 335). For example, the example comparator 330 identifies non-overlapping regions and/or components of the two PSGs, which can share certain overlapping regions (e.g., as shown using overlapping regions 105, 110 of FIG. 1). For example, since a PSG encodes multiple levels of semantics of a piece of code, the differences in PSGs indicate semantic divergences in the corresponding code snippets in one or more levels. If such divergences exist, a potential bug in the second code snippet in the pair can be reported (e.g., using the report generator 345), and the non-overlapping part of two PSGs can be reported as the root causes of the bug.

The example graph generator 335 generates program-derived semantic graphs (PSGs). As described in connection with FIG. 1, a PSG is a graphical structure that captures semantics from code at many levels of granularity and allows for automatic extraction of the program semantics. For example, the PSG includes both semantic and syntactic information through hierarchical abstraction levels. The example graph generator 335 generates PSGs to allow comparison of the reference copy of code with a semantically similar code snippet to allow the example software bug detector 230 to perform bug detection and/or corresponding root cause analysis. While in examples disclosed herein a program-derived semantic graph is used, any other type of graphical data structure can also be generated for the purpose of identifying bugs (e.g., abstract syntax tree, etc.). In some examples, the graph generator 335 determines the type of graphical structure to generate based on the code characteristics and/or type of root cause analysis to be performed.

The example root cause determiner 340 determines a root cause of a software bug. For example, the root cause determiner 340 relies on the PSGs generated using the graph generator 335 and/or the non-overlapping regions of the PSGs identified using the comparator 330. In some examples, the root cause determiner 340 determines a semantically meaningful root cause for bugs based on the generated PSGs. For example, the root cause determiner 340 uses non-overlapping portions of the PSGs to flag potential bugs and their root causes in the corresponding code snippets. In some examples, divergences in the PSGs indicate a potential bug in the code snippet in the pair of codes being compared (e.g., the reference copy of code versus the code being assessed for bugs). In some examples, the root cause determiner 340 determines a specific region of the code that results in the inconsistency between a correct copy of the code and the code being assessed (e.g., a missing null-checking subgraph, etc.).

The example report generator 345 generates a report indicating an identified software bug and/or a root cause of the bug. For example, once the root cause determiner 340 identifies a root cause based on the generated PSGs (e.g., non-overlapping vs. overlapping PSG regions), the report generator 345 generates and/or outputs a report of the identified root cause and/or additional details related to the specific incorrect code identified (e.g., a missing code subgraph, etc.). In some examples, the report generator 345 can include a graphical representation of the identified root cause based on the generated PSGs (e.g., specific regions of non-overlap between the correct code and the code under assessment). In some examples, the report generator 345 presents root cause details based on user preferences (e.g., how the user would like to have the information presented, such as graphically or with direct indication of which code lines are inconsistent with the reference code copy). In some examples, the report generator 345 can be provided to computing device(s) 210 from the software bug detector 230, via the network 220 of FIG. 2.

The example data store 350 can be used to store any information associated with the extractor 305, the identifier 310, the mapper 315, the clusterer 320, the tester 325, the comparator 330, the graph generator 335, the root cause determiner 340 and/or the report generator 345. In some examples, the data store 350 stores generated graphs, previously-identified reference copies of code, and/or root cause analysis data. In some examples, the data store 350 stores reports generated using the report generator 345. In some examples, the data store 350 stores code snippets input by a user for assessment. The example data store 350 of the illustrated example of FIG. 3 can be implemented by any memory, storage device and/or storage disc to store data such as flash memory, magnetic media, optical media, storage on cloud, etc. Furthermore, the data stored in the example data store 350 can be in any data format such as binary data, comma delimited data, tab delimited data, structured query language (SQL) structures, image data, etc.

While an example manner of implementing the software bug detector 230 of FIG. 2 is illustrated in FIG. 3, one or more of the elements, processes and/or devices illustrated in FIG. 3 may be combined, divided, re-arranged, omitted, eliminated and/or implemented in any other way. Further, the example extractor 305, the example identifier 310, the example mapper 315, the example clusterer 320, the example tester 325, the example comparator 330, the example graph generator 335, the example root cause determiner 340, the example report generator 345, and/or more generally the software bug detector 230, may be implemented by hardware, software, firmware and/or any combination of hardware, software and/or firmware. Thus, for example, any of the example extractor 305, the example identifier 310, the example mapper 315, the example clusterer 320, the example tester 325, the example comparator 330, the example graph generator 335, the example root cause determiner 340, the example report generator 345, and/or more generally the software bug detector 230 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), and/or field-programmable gate array (FPGA)). When reading any of the apparatus or system claims of this patent to cover a purely software and/or firmware implementation, at least one of the example extractor 305, the example identifier 310, the example mapper 315, the example clusterer 320, the example tester 325, the example comparator 330, the example graph generator 335, the example root cause determiner 340, the example report generator 345, and/or more generally the software bug detector 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example software bug detector 230 of FIG. 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
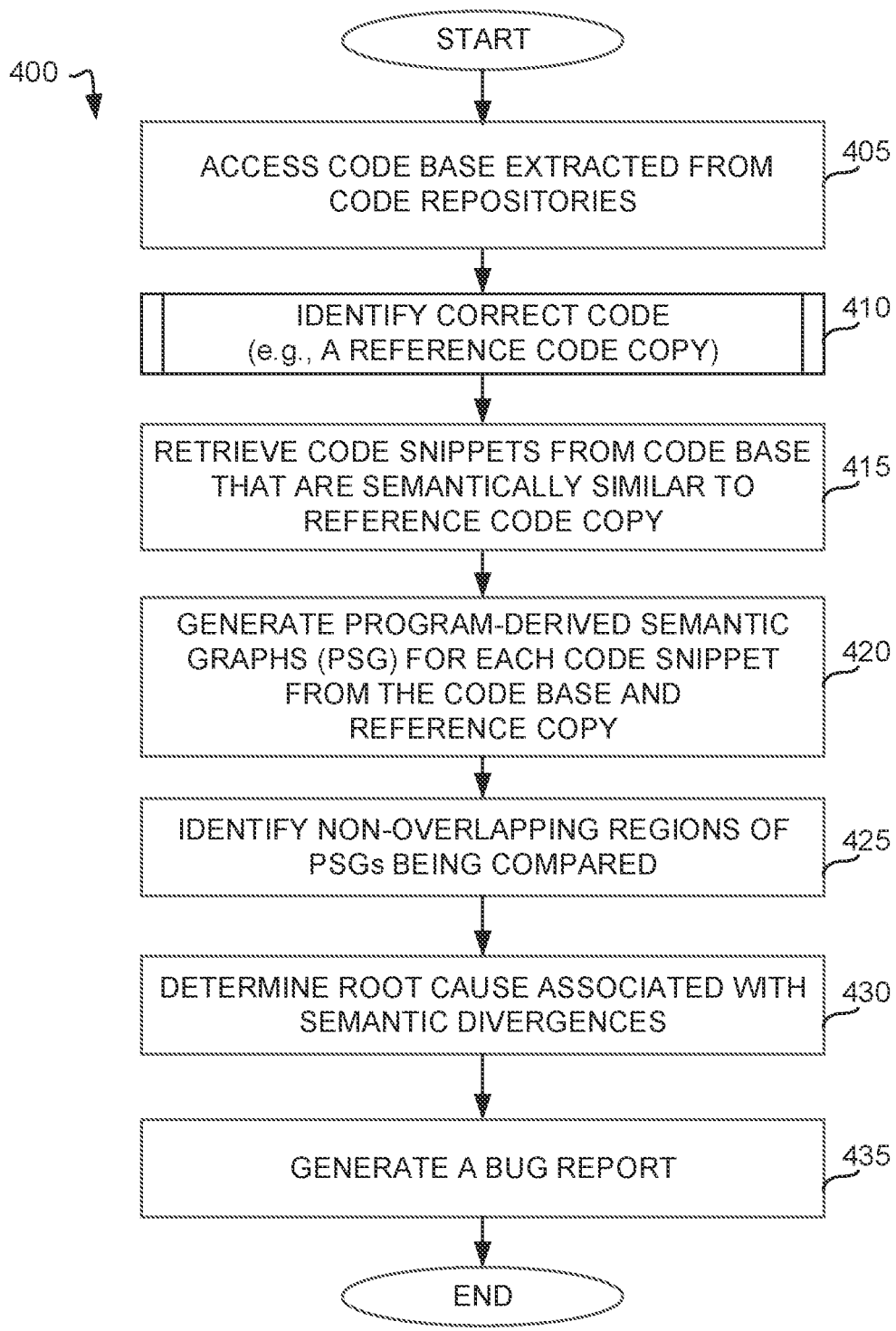
FIG. 4 is a flowchart representative of example machine readable instructions which may be executed to implement the example software bug detector of FIG. 3.
Figure 5:
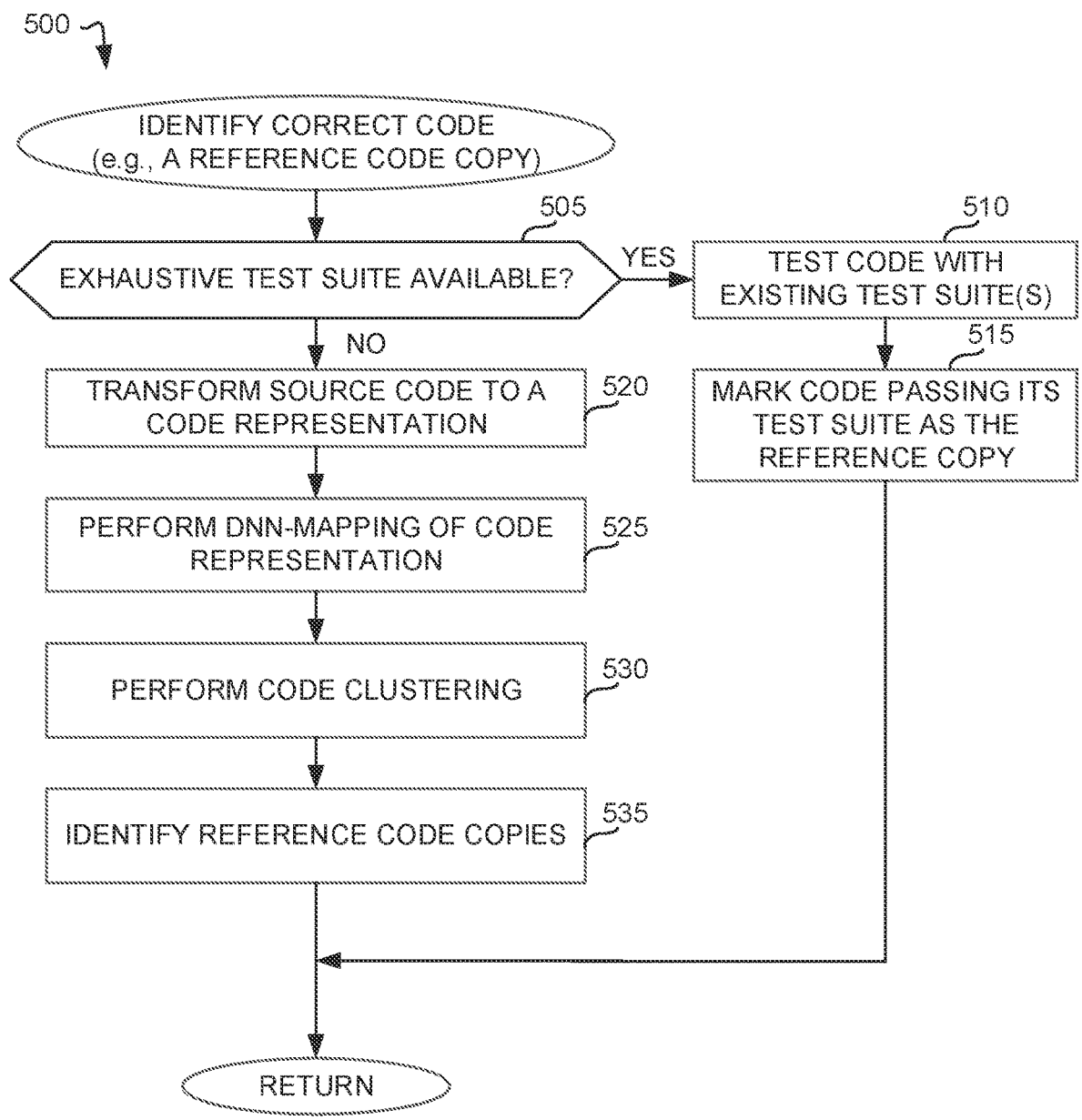
FIG. 5 is a flowchart representative of example machine readable instructions which may be executed to identify correct code (e.g., a reference copy) used for comparison with a code base retrieved from a code repository.

A flowchart representative of example hardware logic, machine readable instructions, hardware implemented state machines, and/or any combination thereof for implementing the software bug detector 230 is shown in FIGS. 4-5. The machine readable instructions may be one or more executable programs or portion(s) of an executable program for execution by a computer processor and/or processor circuitry, such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entirety of the program(s) and/or parts thereof could alternatively be executed by a device other than the processor 712 and/or embodied in firmware or dedicated hardware. Further, although the example program(s) is/are described with reference to the flowcharts illustrated in FIG. 4-5, many other methods of implementing the example software bug detector 230 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions 400 which may be executed to implement the example software bug detector 230 of FIG. 3. In the example of FIG. 4, the software bug detector 230 accesses as input a code base extracted from a code repository (block 405). For example, a code repository contains code in which a user of the system attempts to identify bugs. In some examples, the code repository can be accessed by the software bug detector 230 via the user computing device(s) 210 of FIG. 2. In some examples, the extractor 305 (FIG. 3) extracts the code base from a code repository. In some examples, the code can include a few lines of consecutive code, a function, or a source file, depending on a user's needs.

The example identifier 310 (FIG. 3) identifies a correct code copy (e.g., a "reference" copy) (block 410). For example, the identifier 310 determines the reference copy to use as a standard to compare with semantically similar code for bug and root cause detection. In some examples, the identifier 310 determine(s) the reference code copy based on whether an exhaustive test suite is available. Example instructions that can be used to implement block 410 are as described below in connection with FIG. 5.

The example extractor 305 retrieves code snippets from the code base that are semantically similar to the reference code copy (block 415). For example, when a reference copy is obtained based on comprehensive testing using the tester 325 (FIG. 3), the software bug detector 230 uses a code similarity system (e.g., machine inferred code similarity (MISIM), Aroma, code2vec, etc.) that scores the semantic similarity of two code snippets to scan the entire codebase and collect a set of code snippets that have high similarity scores with the reference copy (e.g., as shown in Phase 2-1 of FIG. 6B). In some examples, the software bug detector 230 selects the code snippets within the same cluster from which a reference copy is identified during clustering (e.g., as shown in Phase 2-2 of FIG. 6B). The output code snippet is highly similar to the corresponding reference copy given that, otherwise, the difference in semantics between the codes could have a higher chance of being caused by a divergence in intention (i.e., different functionalities) rather than a bug. In some examples, the software bug detector 230 filters the output using a code similarity system (e.g., MISIM, Aroma, code2vec, etc.), so that the similarity scores between the final output snippets and the corresponding reference copies meet a pre-defined criterion (e.g., above a constant threshold). The software bug detector 230 groups the obtained code snippets in pairs (e.g., a reference copy and a similar code), such that the two codes are semantically similar to each other.

The example graph generator 335 (FIG. 3) uses the paired code snippets to generate program-derived semantic graphs (PSG) for each code snippet from the code base and the reference copy (block 420). In some examples, the graph generator 335 can generate other graphical representations of the code not limited to PSGs (e.g., abstract syntax trees, etc.). In some examples, the comparator 330 compares the two generated PSGs against each other to identify non-overlapping regions (block 425). For example, the PSGs encode multiple levels of semantics of a piece of code, such that differences in PSGs indicate semantic divergences in the corresponding code snippets in one or more levels. By identifying any non-overlapping regions of the PSGs generated using the graph generator 335, the comparator 330 can be used to target regions of code that indicate a potential bug in the code snippet that is not the reference code. As previously described in connection with FIG. 1, the PSGs include nodes that, when compared, indicate whether some nodes are overlapping or non-overlapping (e.g., overlapping nodes of regions 105, 110).

The example root cause determiner 340 (FIG. 3) determines a root cause associated with semantic divergences (block 430). For example, the root cause determiner 340 determines the root cause of a software bug based on the non-overlapping PSG regions identified using the comparator 330. In some examples, the root cause determiner 340 uses a filtering module to further filter the PSGs to identify differences between the graphs and confirm the absence of false positives and/or false negatives. For example, even if two correct code snippets are identified as closely similar, some different functionalities can still exist between the compared code snippets, such that their PSGs are not entirely similar. In some examples, the root cause determiner 340 can use a machine learning model that takes in two PSGs generated from a similar code snippet pair to predict whether their difference indicates a bug. For example, such a machine learning model could be trained by leveraging human-based feedback on the bug reports reported by the system itself. In some examples, a machine learning model for root cause detection can be trained by mining common bug patterns in the changelogs of the code in the codebase (e.g., git commits).

The example report generator 345 (FIG. 3) generates a report (block 435) to provide a user with the results of the assessment. In some examples, the report generator 345 identifies the type of root cause as determined by the root cause determiner 340. For example, two similar code snippets can attempt to access a memory through a pointer, but a correct code copy (e.g., the reference copy) checks if the pointer could be NULL while the incorrect code copy does not perform such an operation. This difference could result in a missing subgraph involving null-checking in the PSG of the incorrect code, compared with the PSG of the correct code. In such examples, the report generator 345 can include a bug report for the incorrect code along with the root cause represented as the missing null-checking subgraph. The example instructions of FIG. 4 end.

FIG. 5 is a flowchart representative of example machine readable instructions 500 which may be executed to identify correct code (e.g., a reference copy) used for comparison with a code base retrieved from code repositories. The example instructions 500 can be used to implement block 410 of FIG. 4. In the example of FIG. 5, the identifier 310 (FIG. 3) determines the availability of an exhaustive test suite that could be used for identifying a reference code copy (block 505). In some examples, the identifier 310 determines whether an exhaustive test case exists for a portion of the code provided (e.g., by running/executing a given program). For example, exhaustive testing can be performed by running test cases. To determine whether an exhaustive test case exists, the identifier 310 searches for code in a project that invokes APIs provided by common testing framework(s) and determines what function(s) are being tested by the code. If an exhaustive test suite is available, the example tester 325 (FIG. 3) tests the code base extracted from code repositories (block 510). Any code passing a given test suite can be identified by the tester 325 as a correct (reference) copy (block 515). If the example identifier 310 does not identify the presence of comprehensive test suites for a given code base at block 505, the identifier 310 uses a code similarity system to transform the code to a form of code representation (block 520). For example, the identifier 310 can transform code snippets to their vector forms and the vector forms can be used by clustering algorithms (e.g., k-means clustering, mean-shift clustering, DBSCAN, etc.) to produce clusters of codes.

In the example of FIG. 5, the mapper 315 (FIG. 3) performs DNN-mapping of the code representations (block 525). The mapping is used by the clusterer 320 to perform code clustering (block 530). For example, the clusterer 320 clusters the codes such that each cluster contains semantically similar codes. Within each cluster, the example identifier 310 can identify the reference copy of code (block 535) through various ways. In some examples, the identifier 310 defines a centroid of the cluster as the reference copy. In some examples, the identifier 310 relies on semi-trusted labels (e.g., number of GitHub stars) as a criteria for selecting one or more reference copies. Control returns to the instructions of FIG. 4 at which the software bug detector 230 retrieves code snippets from the code base that are semantically similar to the reference code copy, as described above in connection with FIG. 4. The example instructions of FIG. 5 end.

Figure 6A:
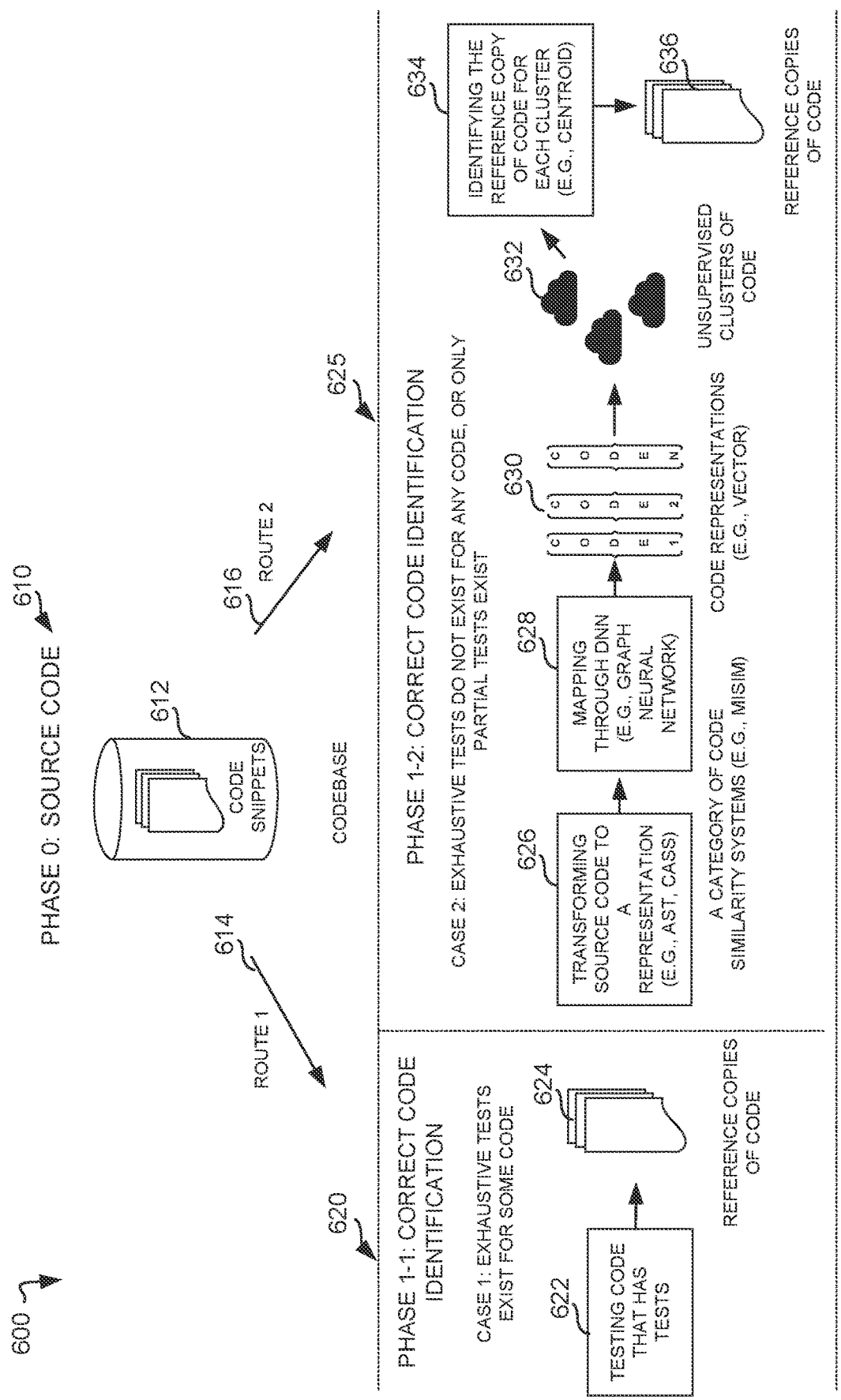
FIG. 6A illustrates an example reference code detection environment to retrieve source code and identify correct code in accordance with examples described in connection with FIGS. 3-5.

FIG. 6A illustrates an example reference code detection environment 600 showing example source code retrieval 610 and example correct code identification 620, 625 in accordance with examples described in connection with FIGS. 3-5. The example reference code detection environment 600 includes an example codebase 612 constructed by extracting code snippets from one or more code repositories. After the codebase 612 is available, the example identifier 310 of FIG. 3 identifies a reference copy of the code using an example first route 614 or an example second route 616. For example, the reference copy identification can be obtained using tests (e.g., exhaustive tests, such as tests that are already written by software developer(s) to fully cover the testing of a piece of software (e.g., black box and/or white box testing)) provided in the code itself (e.g., built-in tests) as represented at block 622. For example, a directory named "tests" in a project can be identified which includes test cases that can be directly executed to test some critical functions. As such, the tester 325 (FIG. 3) tests that code at 622 to obtain example reference copies of code 624 (e.g., route 1). However, if built-in tests are not identified or are only available partially, the example identifier 310 (FIG. 3) performs transformation of source code to an example representation as represented at block 626 (e.g., route 2). In addition, the mapper 315 (FIG. 3) maps the code using deep neural network(s) (e.g., graph-based neural networks) as represented at block 628. The mapping allows for the resulting code representation in example vector form 630. The example clusterer 320 (FIG. 3) then performs code clustering, such that each cluster contains semantically similar codes (e.g., example code clusters 632). The example identifier 310 identifies the reference copy of code for each of the clusters 632 as represented at block 634, resulting in example reference code copies 636, as previously described in connection with FIGS. 4-5.

Figure 6B:
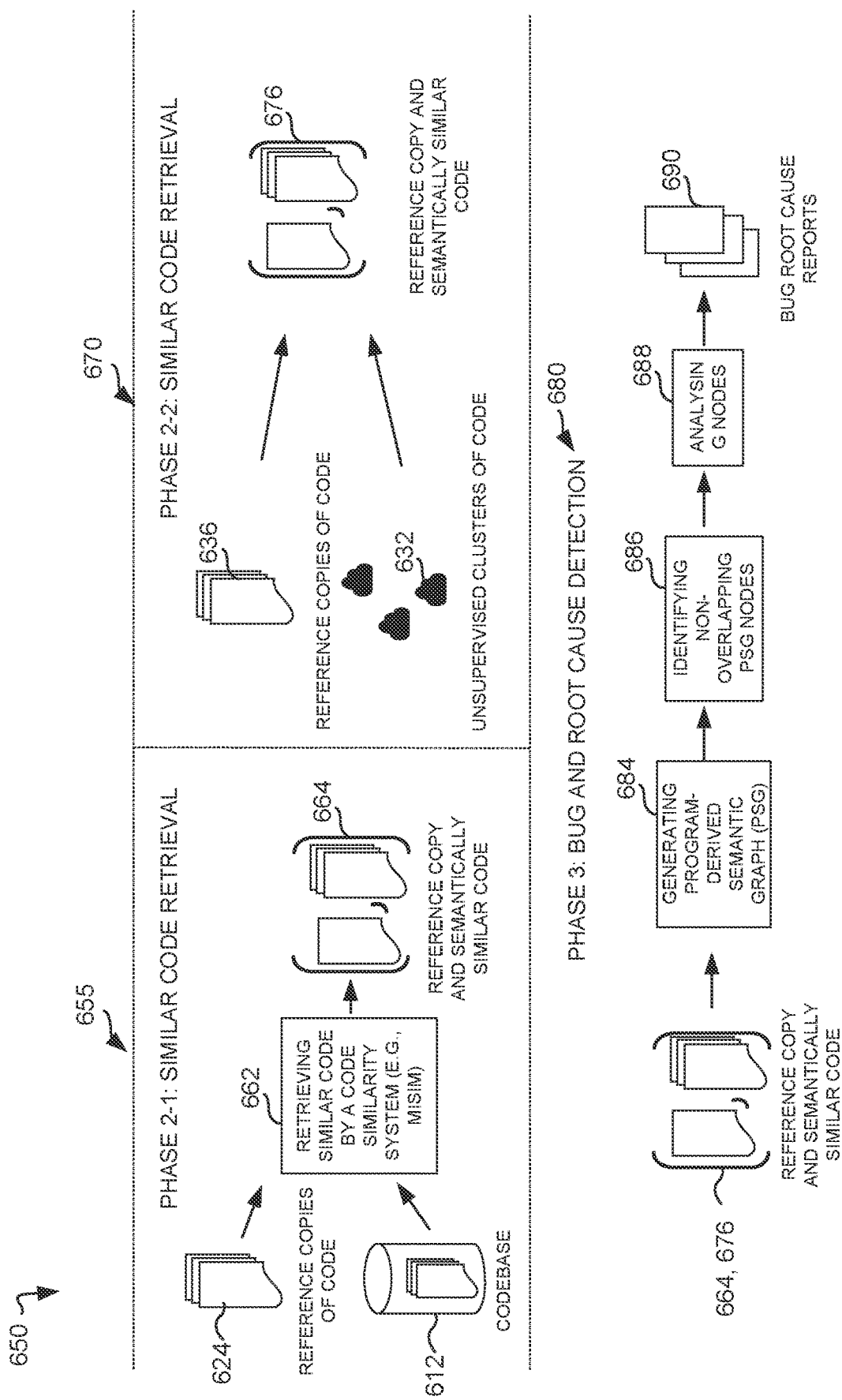
FIG. 6B illustrates an example software bug detection environment to retrieve similar code and detect software bugs and root causes in accordance with examples described in connection with FIGS. 3-4.

FIG. 6B illustrates an example software bug detection environment 650 to perform similar code retrieval 655, 670 and example bug and root cause detection 680 in accordance with examples described in connection with FIGS. 3-4. After the reference copies have been identified as shown in FIG. 6A, the example software bug detector 230 uses the extractor 305 of FIG. 3 to retrieve code snippets from the codebase 612 of FIG. 6A that are semantically similar to the reference copy, as represented by the example pair of reference copy and semantically similar code 664 of Phase 2-1 of FIG. 6B. For example, if the reference copy originates from comprehensive testing (reference copy 624 of FIG. 6A), a code similarity system can be used to score the semantic similarity of the two code snippets and retrieve semantically similar code as represented at block 662 (e.g., collect a set of code snippets with high similarity scores to the reference copy, where the high similarity scores are determined based on a distance between code vector representations, such that the distance between the vector representation is less than a set threshold). In some examples, if the reference copy comes from clustering (reference copy 636 of FIG. 6A), code snippets are selected from the code cluster 632 of FIG. 6A to obtain an example pair of reference copy and semantically similar code 676 of Phase 2-2 of FIG. 6B. An output code snippet should be highly similar to the corresponding reference copy (e.g., meet a predefined similarity threshold), whether the code snippet is retrieved using similar code retrieval of Phase 2-1 655 or similar code retrieval of Phase 2-2 670. The graph generator 335 (FIG. 3) uses the example pair of reference copy and semantically similar code 664, 676 to generate program-derived semantic graphs (PSGs) as represented at block 684. In addition, the comparator 330 (FIG. 3) performs identification of non-overlapping PSG nodes as represented at block 686 to analyze nodes as represented at block 688 to determine a root cause of software bug(s), as described in connection with FIGS. 4-5. The root cause determiner 340 (FIG. 3) determines the root cause(s) based on the non-overlapping PSG nodes. The report generator 345 (FIG. 3) generates one or more example bug root cause report(s) 690 to permit the user to examine the cause of the software bug and/or identify specific sections of the code where the error occurred.

Figure 7:
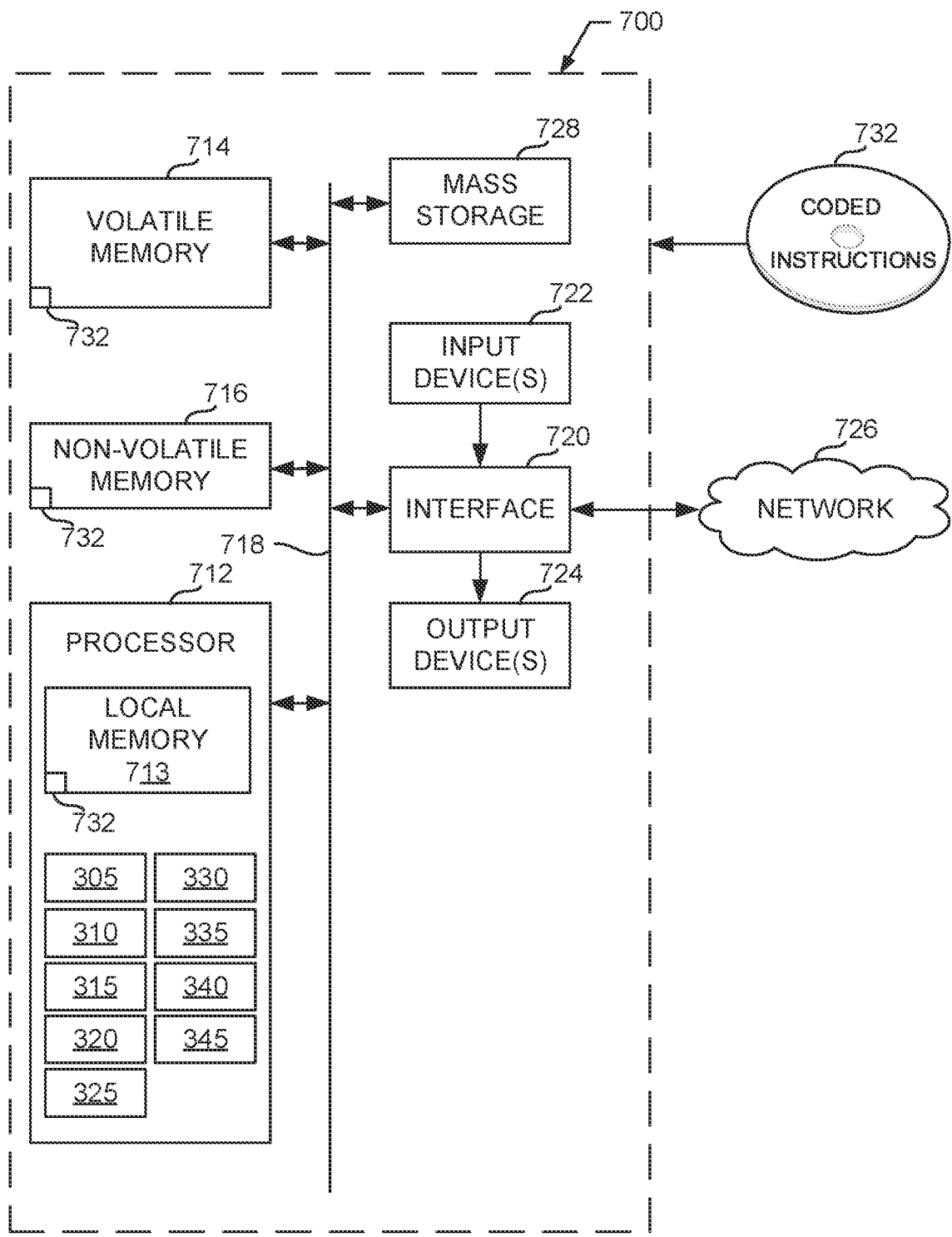
FIG. 7 is a block diagram of an example processor platform structured to execute the example machine readable instructions of FIGS. 4 and 5 to implement the example software bug detector of FIG. 3.

FIG. 7 is a block diagram of an example processor platform structured to execute the example machine readable instructions of FIGS. 4 and 5 to implement the example software bug detector of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor 712 may be a semiconductor based (e.g., silicon based) device. In this example, the processor 712 implements the example extractor 305, the example identifier 310, the example mapper 315, the example clusterer 320, the example tester 325, the example comparator 330, the example graph generator 335, the example root cause determiner 340, and the example report generator 345.

The processor 712 of the illustrated example includes a local memory 713 (e.g., a cache). The processor 712 of the illustrated example is in communication with a main memory including a volatile memory 714 and a non-volatile memory 716 via a link 718. The link 718 may be implemented by a bus, one or more point-to-point connections, etc., or a combination thereof. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Machine executable instructions 732 represented in FIGS. 4 and/or 5 may be stored in the mass storage device 728, in the volatile memory 714, in the non-volatile memory 716, in the local memory 713 and/or on a removable non-transitory computer readable storage medium, such as a CD or DVD 736.

Figure 8:
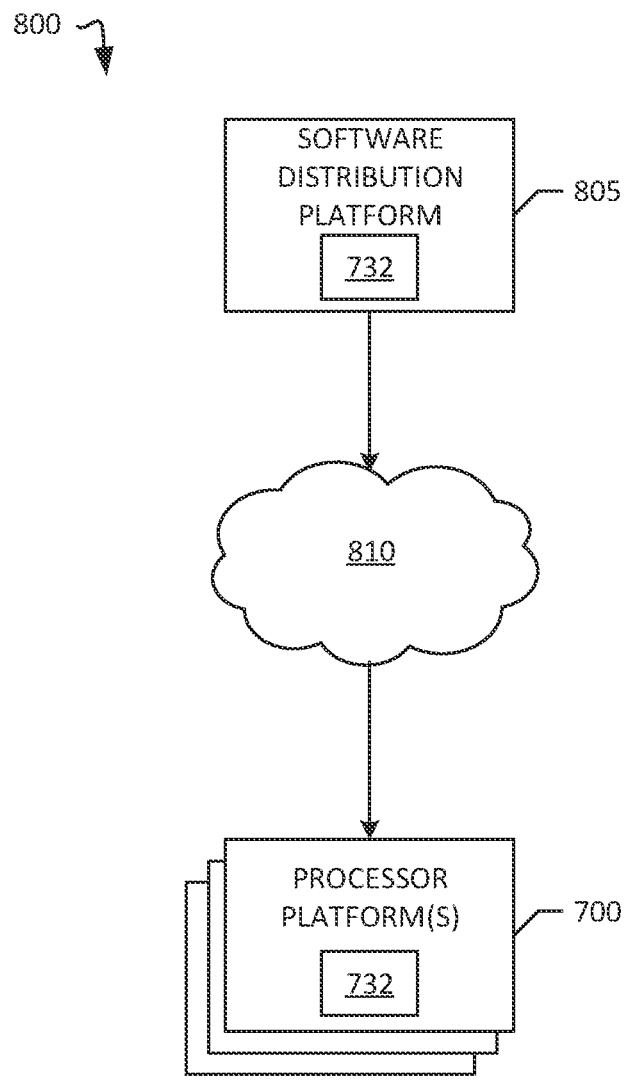
FIG. 8 is a block diagram of an example software distribution platform to distribute software (e.g., software corresponding to the example computer readable instructions of FIGS. 4 and/or 5) to client devices such as consumers, retailers, and/or original equipment manufacturers (OEMs).

FIG. 8 is a block diagram of an example software distribution platform to distribute software (e.g., software corresponding to the example computer readable instructions of FIGS. 4 and/or 5) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram 800 illustrating an example software distribution platform 805 to distribute software such as the example computer readable instructions 732 of FIG. 7 to third parties is illustrated in FIG. 8. The example software distribution platform 3005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example computer readable instructions of FIG. 7, as described above. The one or more servers of the example software distribution platform 805 are in communication with a network 810, which may correspond to any one or more of the Internet and/or any of the example networks 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions of FIGS. 4 and/or 5, may be downloaded to the example processor platform 800, which is to execute the computer readable instructions 732. In some examples, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

From the foregoing, it will be appreciated that methods and apparatus disclosed herein improve automatic detection of software bugs with associated root cause analysis. For example, methods and apparatus disclosed herein permit automatic bug detection and root cause analysis based on program-derived semantic graph(s) (PSGs), which serves as a hierarchical graph representation of code that can capture the semantics of code at various abstraction levels, thereby providing a semantically meaningful root cause for bugs detected. Methods and apparatus disclosed herein also introduce the use of code similarity systems in combination with PSGs to detect bug root causes. Additionally, a similarity system to identify reference copies of code (e.g., vetted semi-trust code) and clustering of an identified reference copy with similar code for bug identification and root cause assessment is presented herein, thereby improving identification of software bugs and reducing the overall timeline of source code development and testing by developers and programmers.

Example methods, apparatus, systems, and articles of manufacture for automatic detection of software bugs are disclosed herein. Further examples and combinations thereof include the following:

Example 1 includes an apparatus comprising a comparator to compare reference code to input code to detect a source code error in the input code, a graph generator to generate a graphical representation of the reference code or the input code, the graphical representation to identify non-overlapping code regions, and a root cause determiner to determine a root cause of the source code error in the input code, the root cause based on the non-overlapping code regions.

Example 2 includes the apparatus of example 1, wherein the graphical representation is a program-derived semantic graph.

Example 3 includes the apparatus of example 1, further including an identifier to identify the reference code using a code similarity system, the code similarity system to collect a code snippet with semantic similarity to the reference code.

Example 4 includes the apparatus of example 3, further including a clusterer to form a code cluster, the code cluster including the reference code and the code snippet with the semantic similarity to the reference code.

Example 5 includes the apparatus of example 4, wherein the clusterer is to form the code cluster using a vector-based representation of the code snippet.

Example 6 includes the apparatus of example 1, further including an extractor to extract code snippets from a code repository, the code repository to include the input code.

Example 7 includes a method, comprising comparing reference code to input code to detect a source code error in the input code, identifying non-overlapping code regions based on a graphical representation of the reference code or the input code, and determining a root cause of the source code error in the input code, the root cause based on the non-overlapping code regions.

Example 8 includes the method of example 7, wherein the graphical representation is a program-derived semantic graph.

Example 9 includes the method of example 7, further including identifying the reference code using a code similarity system, the code similarity system to collect a code snippet with semantic similarity to the reference code.

Example 10 includes the method of example 9, wherein the code similarity system includes machine inferred code similarity (MISIM).

Example 11 includes the method of example 10, further including forming a code cluster, the code cluster including the reference code and the code snippet with the semantic similarity to the reference code.

Example 12 includes the method of example 11, wherein the forming of the code cluster is based on a vector-based representation of the code snippet.

Example 13 includes the method of example 12, wherein the vector-based representation is based on deep neural network mapping.

Example 14 includes the method of example 7, further including extracting code snippets from a code repository, the code repository including the input code.

Example 15 includes At least one non-transitory computer readable medium comprising instructions that, when executed, cause at least one processor to at least detect, based on reference code, a source code error in input code, detect non-overlapping code regions based on a graphical representation of the reference code or the input code, and determine a root cause of the source code error based on the non-overlapping code regions.

Example 16 includes the at least one non-transitory computer readable medium as defined in example 15, wherein the instructions, when executed, cause the at least one processor to generate a program-derived semantic graph.

Example 17 includes the at least one non-transitory computer readable medium as defined in example 15, wherein the instructions, when executed, cause the at least one processor to identify the reference code using a code similarity system, the code similarity system to collect a code snippet with semantic similarity to the reference code.

Example 18 includes the at least one non-transitory computer readable medium as defined in example 17, wherein the instructions, when executed, cause the at least one processor to form a code cluster, the code cluster including the reference code and the code snippet with the semantic similarity to the reference code.

Example 19 includes the at least one non-transitory computer readable medium as defined in example 18, wherein the instructions, when executed, cause the at least one processor to form the code cluster using a vector-based representation of the code snippet.

Example 20 includes the at least one non-transitory computer readable medium as defined in example 15, wherein the instructions, when executed, cause the at least one processor to extract code snippets from a code repository, the repository including the input code.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry;
   machine-readable instructions;
   at least one processor circuit to be programmed by the machine-readable instructions to:
      analyze execution of a code snippet to determine whether the code snippet invokes an application programming interface of a test framework;
      after determining that the code snippet does not invoke the application programming interface of the test framework, map the code snippet into a computer-generated vector space in memory or storage based on a first code vector of the code snippet;
      compare the first code vector from the computer-generated vector space to a second code vector of reference code;
      generate a semantic similarity score based on a distance between the first code vector of the code snippet and the second code vector of the reference code;
      select the code snippet as input code based on the semantic similarity score;
      generate at least one graphical representation of at least one of the reference code or the input code, the at least one graphical representation to identify a non-overlapping code region; and
      determine a root cause of a source code error in the input code, the root cause based on the non-overlapping code region.

2. The apparatus of claim 1, wherein the at least one graphical representation is a program-derived semantic graph.

3. The apparatus of claim 1, wherein one or more of the at least one processor circuit is to select the code snippet as the input code based on a code similarity system.

4. The apparatus of claim 3, wherein one or more of the at least one processor circuit is to form a code cluster, the code cluster including the reference code and code snippet.

5. The apparatus of claim 4, wherein one or more of the at least one processor circuit is to form the code cluster based on a vector-based representation of the code snippet.

6. The apparatus of claim 1, wherein the machine-readable instructions are to cause one or more of the at least one processor circuit to extract the code snippet from a code repository.

7. The apparatus of claim 1, wherein one or more of the at least one processor circuit is to:
   determine a type of clustering based on at least one of computational resources or data availability;
   assign the code snippet to a cluster based on the type of clustering; and
   select the code snippet and the reference code from the cluster.

8. At least one non-transitory computer readable medium comprising instructions to cause at least one processor circuit to at least:
   analyze execution of a code snippet to determine whether the code snippet includes a test that invokes an application programming interface of a test framework, the test to identify the code snippet as reference code;
   after determining that the code snippet does not include the test, map the code snippet into a computer-generated vector space in memory or storage based on a first code vector of the code snippet;
   compare the first code vector from the computer-generated vector space to a second code vector of the reference code;
   generate a semantic similarity score based on a distance between the first code vector of the code snippet and the second code vector of the reference code;
   select the code snippet as input code based on the semantic similarity score;
   detect, based on the reference code, a source code error in the input code;
   detect a non-overlapping code region based on at least one graphical representation of at least one of the reference code or the input code; and
   determine a root cause of the source code error based on the non-overlapping code region.

9. The at least one non-transitory computer readable medium as defined in claim 8, wherein the instructions are to cause one or more of the at least one processor circuit to generate a program-derived semantic graph.

10. The at least one non-transitory computer readable medium as defined in claim 8, wherein the instructions are to cause one or more of the at least one processor circuit to identify the reference code based on a code similarity system, and select the code snippet using the code similarity system.

11. The at least one non-transitory computer readable medium as defined in claim 10, wherein the instructions are to cause one or more of the at least one processor circuit to form a code cluster, the code cluster including the reference code and the code snippet.

12. The at least one non-transitory computer readable medium as defined in claim 11, wherein the instructions are to cause one or more of the at least one processor circuit to form the code cluster using a vector-based representation of the code snippet.

13. The at least one non-transitory computer readable medium as defined in claim 8, wherein the instructions are to cause one or more of the at least one processor circuit to extract the code snippet from a code repository.

14. An apparatus comprising:
   identifier circuitry to determine whether a code snippet invokes an application programming interface of a test framework based on execution of the code snippet;
   mapper circuitry to, after a determination that the code snippet does invoke the application programming interface of the test framework, map the code snippet into a computer-generated vector space in memory or storage based on a first code vector of the code snippet;

software bug detector circuitry to select the code snippet as input code based on a semantic similarity score, the semantic similarity score based on a distance between the first code vector of the code snippet and a second code vector of reference code;

graph generator circuitry to generate at least one graphical representation of at least one of the reference code or the input code, the at least one graphical representation to identify a non-overlapping code region; and root cause determiner circuitry to determine a root cause of a source code error in the input code, the root cause based on the non-overlapping code region.

15. The apparatus of claim 14, wherein the at least one graphical representation is a program-derived semantic graph.

16. The apparatus of claim 14, wherein the software bug detector circuitry is to select the code snippet as the input code based on a code similarity system.

17. The apparatus of claim 14, including clusterer circuitry to form a code cluster, the code cluster including the reference code and the code snippet.

18. The apparatus of claim 17, wherein the clusterer circuitry is to form the code cluster based on a vector-based representation of the code snippet.

19. The apparatus of claim 17, wherein the clusterer circuitry is to form the code cluster based on deep neural network mapping.

20. The apparatus of claim 14, including clusterer circuitry to:

determine a type of clustering based on at least one of computational resources or data availability; and assign the code snippet to a cluster based on the type of clustering, the software bug detector circuitry is to select the code snippet and the reference code from the cluster.

21. The apparatus of claim 14, including extractor circuitry to extract the code snippet from a code repository.

* * * * *

UNITED STATES PATENT AND TRADEMARK OFFICE
CERTIFICATE OF CORRECTION

| | |
|---|---|
| PATENT NO. | : 12,314,690 B2 |
| APPLICATION NO. | : 17/133238 |
| DATED | : May 27, 2025 |
| INVENTOR(S) | : Ye et al. |

Page 1 of 1

It is certified that error appears in the above-identified patent and that said Letters Patent is hereby corrected as shown below:

In the Claims

Column 19, Claim 4, Line 60, delete "and code snippet" and Insert --and the code snippet--.

Signed and Sealed this
Nineteenth Day of August, 2025

Coke Morgan Stewart
*Acting Director of the United States Patent and Trademark Office*